United States Patent
Aljadeff et al.

[11] Patent Number: 5,729,196
[45] Date of Patent: Mar. 17, 1998

[54] PERSONAL LOCATION AND MESSAGE SYSTEM AND UNIT

[75] Inventors: Daniel Aljadeff, Kiriat Ono; Shalom Tsruya, Rishon Lezion; Zohar Azani, Ramat Gan; Zohar Livni, Raanana, all of Israel

[73] Assignee: Tadiran Ltd., Holon, Israel

[21] Appl. No.: 733,122

[22] Filed: Oct. 17, 1996

Related U.S. Application Data

[63] Continuation of Ser. No. 333,049, Nov. 1, 1994, abandoned.

[30] Foreign Application Priority Data

Nov. 1, 1993 [IL] Israel ......................... 107461

[51] Int. Cl.⁶ ................................. G08B 26/00
[52] U.S. Cl. .............. 340/505; 340/539; 340/825.44; 340/504; 340/311.1; 455/11.1; 455/38.2; 455/56.1; 455/54.1
[58] Field of Search .................... 340/539, 531, 340/825.44, 825.47, 311.1, 504; 455/11.1, 53.1, 54.1, 89, 56.1, 38.2, 66; 379/37, 38, 49, 56; 375/1, 7

[56] References Cited

U.S. PATENT DOCUMENTS

| | | | |
|---|---|---|---|
| 4,742,357 | 5/1988 | Rackley | 342/457 |
| 4,918,425 | 4/1990 | Greenberg et al. | 340/539 |
| 5,278,539 | 1/1994 | Lauterbach et al. | 340/539 |
| 5,335,246 | 8/1994 | Yokev et al. | 340/825.44 |
| 5,361,399 | 11/1994 | Linquist et al. | 455/54.1 |
| 5,373,300 | 12/1994 | Jenness et al. | 455/89 |
| 5,379,047 | 1/1995 | Yokev et al. | 342/457 |
| 5,416,468 | 5/1995 | Baumann | 340/539 |
| 5,430,759 | 7/1995 | Yokev et al. | 375/202 |
| 5,440,449 | 8/1995 | Scheer | 361/686 |
| 5,440,559 | 8/1995 | Gaskill | 455/38.3 |
| 5,450,395 | 9/1995 | Hostetter et al. | 370/18 |
| 5,499,266 | 3/1996 | Yokev et al. | 375/202 |
| 5,519,718 | 5/1996 | Yokev et al. | 375/202 |
| 5,530,452 | 6/1996 | Yokev et al. | 342/457 |

FOREIGN PATENT DOCUMENTS

| | | |
|---|---|---|
| 0 583 522 A2 | 2/1994 | European Pat. Off. |
| WO95/14935 | 6/1995 | WIPO |

*Primary Examiner*—Donnie L. Crosland
*Attorney, Agent, or Firm*—Merchant, Gould, Smith Edell, Welter & Schmidt, P.A.

[57] ABSTRACT

A portable receiving/transmitting unit is adapted to communicate with a master station, the master station being associated with a plurality of base stations, a plurality of pagers and a plurality of individual receiving/transmitting units. The portable receiving/transmitting unit includes, integrated into one unit, structure for receiving a data string encoding a personal message which is broadcasted by the master station together with a unit identifying code through a plurality of pagers; structure for conveying the broadcasted message to the operator of the receiving unit identified by the identifying code; and structure for generating a message and for transmitting it from the portable unit to the receiving base stations together with a unit identifying code.

13 Claims, 5 Drawing Sheets

PERSONAL LOCATION AND MESSAGE SYSTEM AND UNIT

This is a Continuation of application Ser. No. 08/333,049, filed Nov. 1, 1994 now abandoned.

FIELD OF THE INVENTION

The present invention relates to the field of telecommunication. More particularly, the invention relates to personalized combined location and message systems.

BACKGROUND OF THE INVENTION

In recent years much effort has been spent in providing large radius vehicle location systems (VLS), which make it possible to monitor the activity of a plurality of vehicles. The VLS is used for a variety of uses: it can be used to pinpoint the location of a stolen or lost vehicle, or to monitor the activity of a plurality of commercial vehicles, e.g., lorries, etc. The VLS typically comprises a Master Station, which is responsible for the management of the transmitted and received information, a number of Base Stations, located in different locations within the active area, and a plurality of Pagers. When it is desired to locate a vehicle, the Master Station transmits a location order to the Pagers, which includes an identifying signal (normally a string of characters) belonging to the specific vehicle which it is desired to locate.

The vehicle is provided with a Vehicle Location Unit (VLU), which comprises a receiver and a transmitter, which receiver is always active and identifies its identifying signal, when it is broadcasted by the Pagers. The broadcasting effected by the Pagers is carefully synchronized, so that only one signal is received by the VLU. When a VLU identifies its own identifying signal its activates its transmitter which transmits an answerback signal. The answerback signal is picked up by a number of base stations which, in turn, transmit the pick-up information to the master station. Knowing the location of the base stations which have received the signal makes it possible, by means well known in the art, to determine the location of the responding vehicle. This situation is schematically shown in FIG. 1. The Master Station is marked MS in FIG. 1, the Base stations are BS, and the pagers are indicated by the boxes P. In the situation shown in FIG. 1, Base Stations 1, 4 and 5 have picked up the answer back signal transmitted by the vehicle, and have transmitted it to the Master Station.

A substantial drawback of the VLS of the art is that they are limited to answerback information, and ultimately only provide location information. Thus, the amount of equipment and the corresponding costs involved are very high, relative to the result obtained. Furthermore, the prior art VLS are limited to units which are integrally connected to the vehicle, which further limits their use. The prior art systems do not permit to exploit the high capability of the VLS for the purpose of locating individuals, or to permit such individuals, who are not in or near a vehicle, to enjoy the power of the VLS.

SUMMARY OF THE INVENTION

It is an object of the present invention to provide a system which exploit the VLS system for purposes other than vehicle location.

It is another object of the invention to exploit VLS for personal messaging purposes.

It is another object of the invention to provide a personal location and/or message unit which can be used in connection with prior art VLS.

Other objectives of the invention will become apparent as the description proceeds.

In an aspect, the invention is directed to a portable receiving/transmitting unit adapted to communicate with a Master Station, the said Master Station being associated with a plurality of Base Stations, a plurality of Pagers and a plurality of individual receiving/transmitting units, the said portable receiving/transmitting unit comprising:

means for receiving a data string encoding a personal message which is broadcasted by the said Master Station, together with a unit identifying code, through a plurality of pagers;

means for conveying the broadcasted message to the operator of the receiving unit identified by the identifying code; and means for generating a message and for transmitting it from the portable unit to the receiving Base Stations, together with a unit identifying code;

the said means being integrated into a unit.

Thus, according to the invention, there is provided a personal device which allows its owner to become a part of the VLS, to receive and transmit messages through the VLS and its units, and to be located by the VLS at any time. This feature is particularly important, e.g., for old people or for people which suffer from diseases associated, e.g., with amnesia, or for people who wish to walk through unpopulated and dangerous areas, e.g, mountain areas, as it permits to locate them even if they are injured or otherwise unable to transmit a message. Of course, if privacy is desired, the unit can simply be turned off.

A person wishing to convey a message to the owner of the personal location unit (PLU) may select a message, either directly or through the operator of the Master Station, append it to the signal which is broadcasted as a part of the unit location routine, and the unit which receives its own identifying signal will be the only one to decode the appended message. It should be noted that, since only the unit to which the message is directed will "listen" to the message, complete privacy is obtained, just as in conventional pager systems. As will be apparent to the skilled person, causing the addressed to unit to be the only unit which decodes the transmitted message is well within the scope of the routineer, as is normally achieved also in VLS today. In general, this is done by allowing the unit to operate only if the identifying signal, which is transmitted at the beginning of the broadcasting, is the personal identifying signal of the decoding unit.

As will be apparent to the skilled person, there is no limitation to the kind and type of message that can be transmitted according to the invention.

According to a preferred embodiment of the invention the broadcasted message is a vocal message and the means provided within the individual receiving/transmitting unit for conveying the broadcasted message to the operator of the receiving unit identified by the identifying code comprise a loudspeaker. Conventional speech synthesizing means can, of course, be used for this purpose. In another preferred embodiment of the invention, on the other hand, the broadcasted message is a written message and the means provided within the individual receiving/transmitting unit for conveying the broadcasted message to the operator of the receiving unit identified by the identifying code comprise a display. Of course, more than one type of message can be used at the same time, to produce mixed outputs at the receiving unit. If it is desired to produce a written message to be displayed on a display, it is convenient to use an ASCII code, but of course any other code, which can be translated into displayed letters, can be used instead.

Likewise, the message generated by the personal unit can also be of any kind, and can comprise vocal, written or other coded message, alternatively or simultaneously. According to a preferred embodiment of the invention, the means provided within the individual receiving/transmitting unit for generating a message and for transmitting it to the receiving Base Stations comprise microphone means. According to another preferred embodiment of the invention, the means provided within the individual receiving/transmitting unit for generating a message and for transmitting it to the receiving Base Stations comprise keyboard means.

Thus, the invention exploits existing equipment, which has been so far used only to broadcast location signals, as a personal and portable two-way communication system, which may provide at the same time both location information and two-way communication between the person carrying the unit and a Main Station. Of course, suitable power supply means must be provided. If the PLU is used in a vehicle, it can replace the conventional VLU, and power can be drawn from the vehicle itself. Additionally, rechargeable or replaceable batteries can also be provided.

The invention is further directed to a personal location and message unit, for use with a Vehicle Location System, comprising:

- a housing provided with autonomous power supply means;
- elaborating means for identifying a unit identifying code and for elaborating received and transmitted signals;
- transmission means for broadcasting messages and/or answer back signals to a plurality of Base Stations;
- receiving means for receiving messages and/or signals broadcasted by a plurality of pagers;
- means for conveying received messages to the operator of the receiving unit; and
- means for generating messages and for transmitting them to the receiving Base Stations.

Also encompassed by the present invention is a portable receiving/transmitting unit adapted to communicate with a Master Station, the said Master Station being associated with a plurality of Base Stations, a plurality of Pagers and a plurality of individual receiving/transmitting units, the said portable receiving/transmitting unit comprising a computer board associated with a communication board, the said communication board being connected to the said computer board via standard communication interface means.

As will be appreciated by the skilled person, the invention thus turns any portable computer, such as normally available laptop computers, into a PLU, by the simple connection of a communication board to the said computer.

The communication interface can be of any suitable type, and in this respect the term "standard communication interface means" is meant to signify any interface provided within the computer, of the types existing today or of any other suitable type which may be developed for future use. A representative but non-limitative example of interface is the so-called PMCIA interface, which presently is a standard communication interface for laptop computers.

According to a preferred embodiment of the invention, the communication board comprises a transmitter, a receiver, an antenna, data processing means and interface means to communicate with the processing means of the portable computer and to process data sent therefrom or received through the said antenna.

Of course, the unit of the invention can comprise additional conventional means, such as memory means to memorize a message for later review by the owner. However, such conventional elements, which will be easily recognized by a person skilled in the art, are not discussed herein, for the sake of brevity.

All the above and other characteristics and advantages of the invention will be better understood through the following illustrative and non-limitative description of preferred embodiments.

DETAILED DESCRIPTION OF PREFERRED EMBODIMENTS

Figure 1:
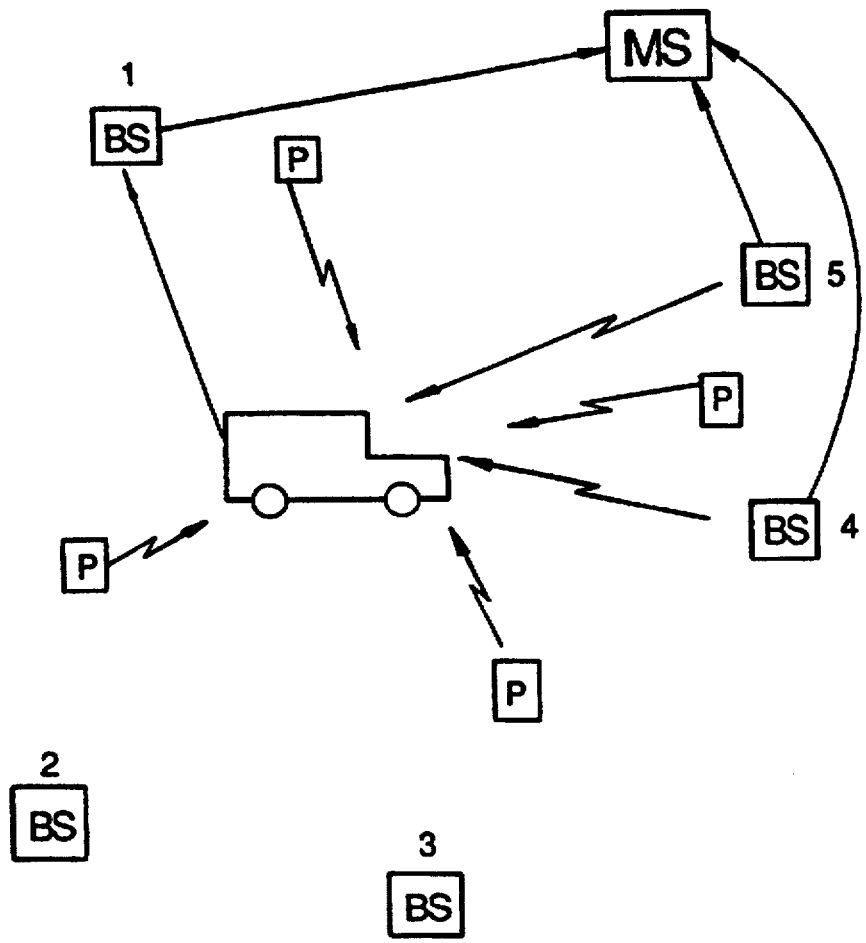
FIG. 1 is a schematic representation of the layout of a VLS.

FIG. 1 schematically represents the layout of a VLS, as discussed above. The very same layout is employed, according to the invention, for the purpose of personal communication, without changing the location of the various units and stations, nor the relations between them.

Figure 2:
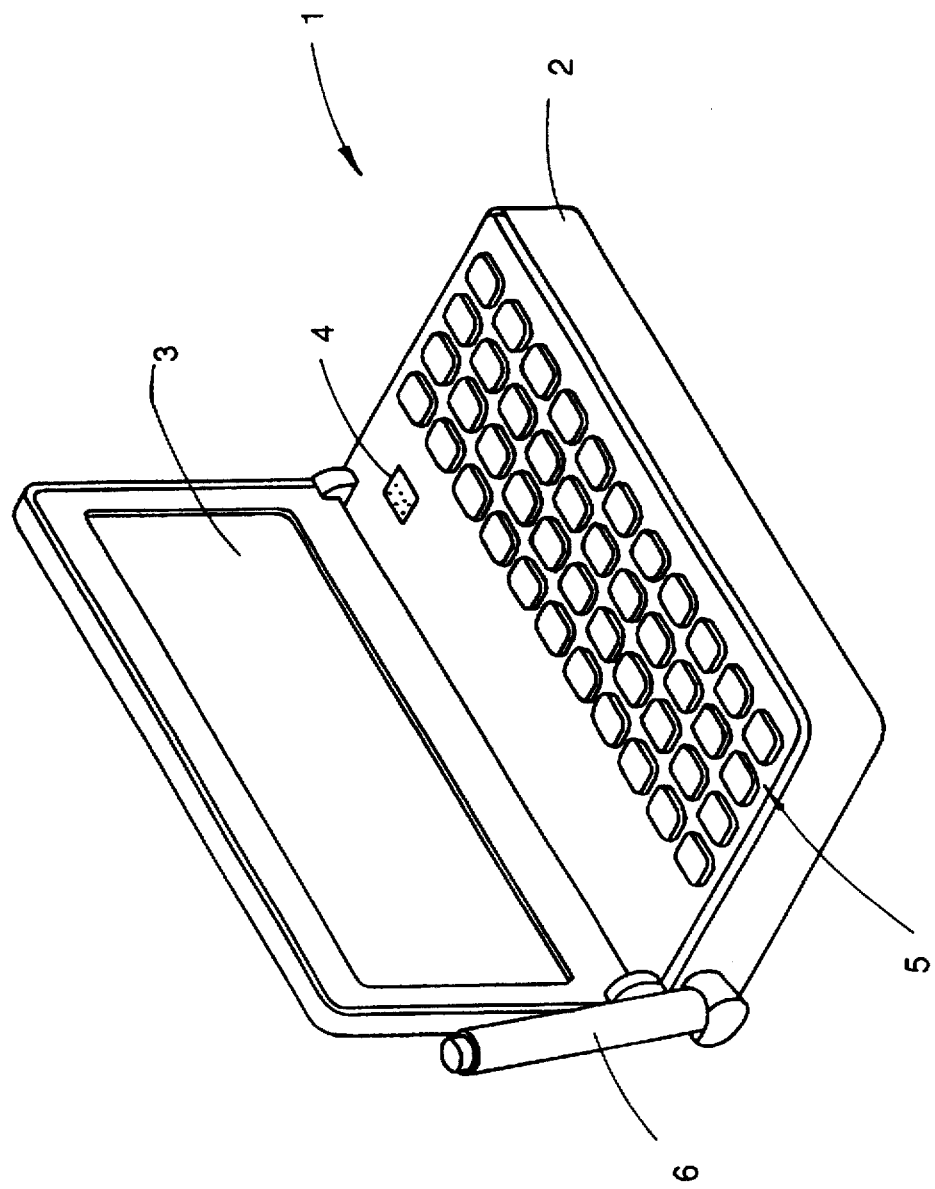
FIG. 2 schematically shows a personal unit according to one embodiment of the invention.

FIG. 2 schematically shows a perspective view of a personal unit, according to one embodiment of the invention. The unit, generally indicated by numeral 1, comprises a housing 2, which is fitted with an LCD 3, a speaker/microphone assembly 4, and a keyboard 5. The keyboard 5 can be of the conventional type, or can be a specialized keyboard, as desired for the specific type of PLU. An antenna 6 is provided, which can conveniently telescopic.

Figure 3:
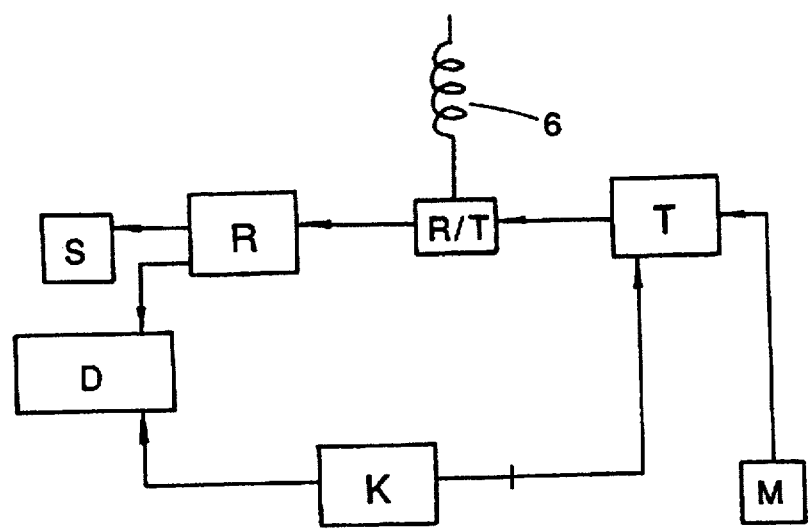
FIG. 3 is a functional block diagram of the unit of FIG. 2.

FIG. 3 shows in block diagram the various elements of the PLU of FIG. 2. The antenna 6 is connected, via a switch R/T, to a receiver R and to a transmitter, T. The receiver R receives the signal from the pagers and, through suitable signal elaborating means (not shown) transmits it either to the speaker, S, or to the display means, D, or to both, as the case may be. The display D also displays messages prepared to be transmitted by the unit, which are keyed-in through keyboard K. Again, the elaborating means used to elaborate the signal and to transmit it to the display means D, or to the transmitter T, are not shown for the sake of simplicity, as they are conventional. Similarly, the message can be an oral message provided to the transmitter T by the microphone, M.

The unit is powered by suitable power means (not shown), which may be, e.g., rechargeable batteries of the type used with cellular telephones. Additional power supply connections can be provided, to connect the unit to alternative sources of power, when available, e.g., to the battery of a vehicle. Likewise, antenna 6 can be bypassed through the connection to a vehicle antenna, if desired.

Figure 4:
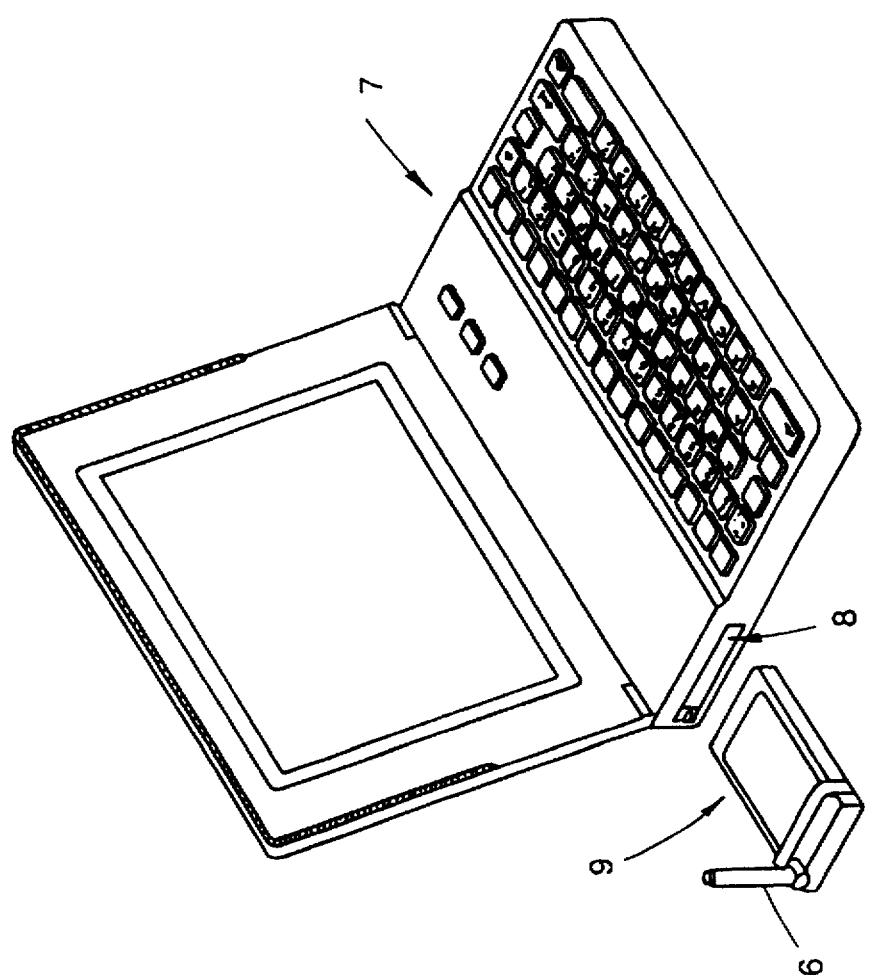
FIG. 4 schematically shows a personal unit, according to another preferred embodiment of the invention, with removable communication board.

FIG. 4 illustrates a preferred embodiment of the invention. A portable computer 7 (a so-called "notebook"), is provided with all the normal elements, such as a keyboard and display means. A communication slot 8 is provided in the computer, which comprises connections to interface means (not shown), e.g., to a PMCIA interface. A communication board 9, provided with receiving/transmitting means, interface means and an antenna 6, is designed so as to fit in slot 8. When board 9 is inserted in slot 8 it is capable of communicating with the computer 7, to display messages on its display and to receive input from its keyboard.

Figure 5:
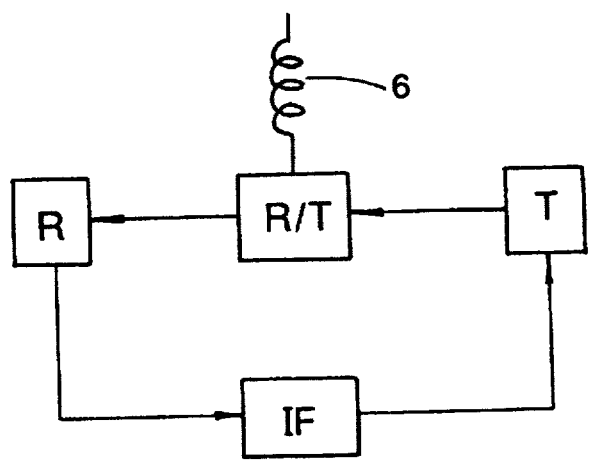
FIG. 5 is a functional block diagram of the communication board of the embodiment of FIG. 4.

As schematic representation of the major components of board 9 is seen in FIG. 5. A transmitter, T, and a receiver, R, are appropriately connected to antenna 6, via switch R/T. The transmitter and receiver are further connected to interface means IF, which connects with the appropriate connection in slot 8 of computer 7 of FIG. 4 (not shown). Processing means are provided for operating the assembly of FIG. 5, which are not shown in the figure for the sake of simplicity.

The PLU of the invention operates according to normally acceptable standards and values, well known to the skilled person. For instance, and without limitation to a specific band, the transmission can effected within the RF bands 904–928 MHz or 960–968 MHz. The receiving power consumption of the R/T unit (not taking into account the normal computer power requirements) is about 300–400 mW. The transmission power consumption is about 1–5 Watt.

Figure 6:
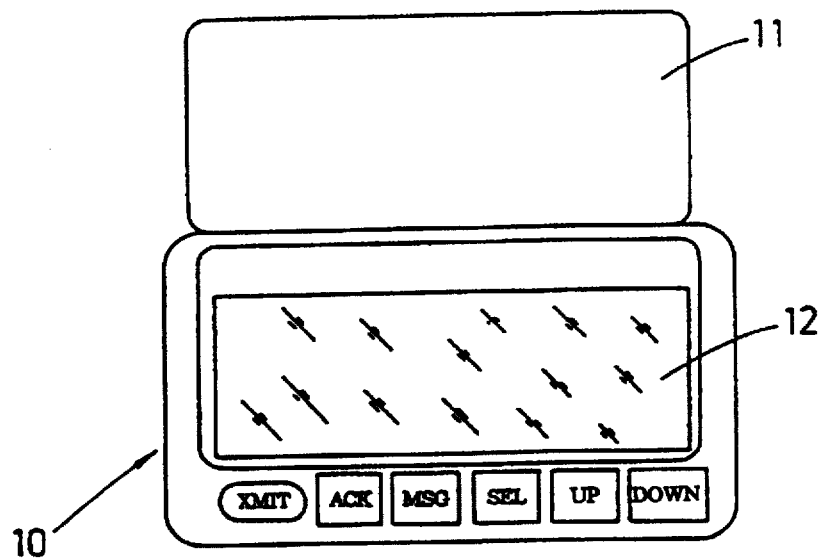
FIG. 6 illustrates a personal unit, according to another preferred embodiment of the invention.

FIG. 6 shows a simplified unit, according to another preferred embodiment of the invention. This unit is particularly convenient for use with pre-prepared messages for transmission. When operating with pre-prepared messages, the operation is very simple, since no full key-board is needed, and the operations are all performed using a limited number of keys. Of course, the number of function keys and their tasks can vary, based on the requirements of a unit intended for a given use. In FIG. 6 a unit generally indicated by numeral 10 is shown, having a number of keys are shown for the purpose of illustration, but it is clear that the invention is in no way limited to this or to any other combination of keys. The keys shown in FIG. 6 are as follows:

ACK: Used to acknowledge an incoming message;

MSG: Used to select and display a received message from a message bank;

SEL: Used to select a menu option;

DOWN: Used to browse through pre-prepared menu options (backwards);

UP: Used to browse through pre-prepared menu options (forward);

XMIT: Used to transmit a selected message.

The unit is further provided with a flip-up cover 10, which according to this preferred embodiment of the invention also contains an internal antenna, and with an LCD display 11. The physical elements suitable for assembling the unit of FIG. 6 will be easily apparent to the skilled person. By way of illustration, and without intending to introduce any limitation in the element suitable for this purpose, the LCD display may be, e.g., a Seiko G121300N000, the microcontroller (further discussed below with reference to FIG. 7) may be an 80C31, RAM 32K×8 or 8K×8, the digital section may be a Tadiran LT 9201 or LT 9401 or compatible, the DC—DC Converter may be an LT1300 (ex Linear Tech.) or similar, and the transmitter may be based on a PF0132 power amplifier and a PMB2200 vector modulator.

Figure 7:
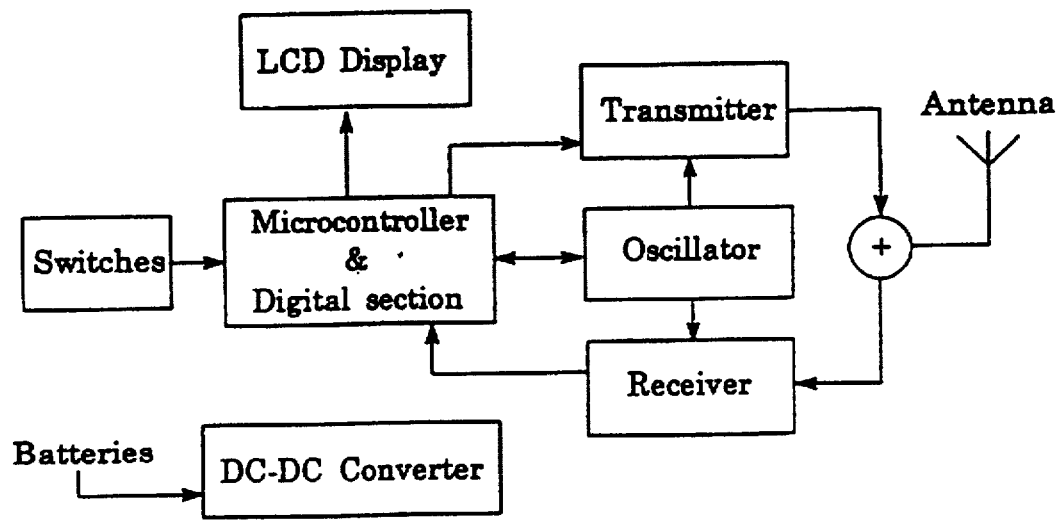
FIG. 7 is a functional block of the unit of FIG. 6.

FIG. 7 shows a block diagram of one possible implementation of the device of FIG. 6. The unit is operated from standard batteries and comprises the following functional blocks;

1) A DC—DC converter, used to convert the battery voltage to the voltages used by the unit;

2) Switches used for normal operation of the unit (e.g., unit setup, message selection and transmission, message retrieval, etc.);

3) A microcontroller and digital section including a processor that controls the unit, encodes and decodes messages, displays menus and messages and all other functions specified by the operator;

4) LCD display used to display all the information required to operate the unit. The display may include back illumination to allow operation in the darkness;

5) Transmitter used to modulate and transmit location signals, data and voice messages;

6) receiver used to receive and demodulate data messages and commands and voice messages;

7) Oscillator used to generate a stable and accurate frequency source to be used by the RF sections and microcontroller. This oscillator may be implemented in several ways, including DTCXO, TCXO or other circuits that exhibit the necessary unit performance.

As will be apparent to the skilled person, the invention permits to achieve the most desirable result to provide substantially enhanced communication power, without the need for more than minor additions and changes in the infrastructure. Thus, the existing VLS can be exploited, thanks to the invention, the added cost being only marginal. Another desired result achieved by the invention is that, since personal communication makes it useful for a person to carry an improved VLU according to the invention outside a vehicle, personal location also becomes possible at the same time, which was so far limited to vehicles only. The ability to provide personal location is important for many reasons: for instance, directions to persons found in an unfamiliar area can be provided via the improved VLU, or missing persons can be easily found. Thus, many different uses can be made of the invention, and many different improved VLUs and system exploiting them can be devised, all without exceeding the scope of the invention.

We claim:

1. A portable receiving/transmitting unit adapted for cooperation with a Master Station, a plurality of Base Stations, and a plurality of Pagers, said Master Station being capable of broadcasting through the Pagers an identifying signal for identifying an addressee, and first messages appended to said signal, and the Base Stations being capable of receiving an answer-back signal from said addressee and second messages appended thereto and transmitting the answer-back signal and second messages to the Master Station, said portable receiving/transmitting unit comprising:

means for receiving and recognizing the identifying signal identifying the portable receiving/transmitting unit as the addressed and for receiving the first messages appended thereto;

means for conveying said first messages to an operator of the receiving/transmitting unit;

means for the operator to generate said second messages; and means for transmitting the second messages to the Base Stations, together with the answer-back signal;

wherein said means for receiving and recognizing, said means for conveying, said means for the operator to generate, and said means for transmitting are integrated into said portable receiving/transmitting unit.

2. A unit according to claim 1, wherein the first messages are vocal messages and the means for conveying comprise a loudspeaker.

3. A unit according to claim 1, wherein the first messages are written messages and the means for conveying comprise a display.

4. A unit according to claim 1, wherein the means for the operator to generate comprise a microphone.

5. A unit according to claim 1, wherein the means for the operator to generate comprise a keyboard.

6. A unit according to claim 1, wherein the means for the operator to generate comprise memory means comprising a memory bank in which pre-prepared messages are stored, and key means to select the desired pre-prepared message from the said memory bank, and to transmit the desired pre-prepared message.

7. A unit according to claim 1, wherein operation of the receiving/transmitting unit is performed through actuation of predetermined function keys.

8. A unit according to claim 1, further comprising power supply means for supplying power.

9. A unit according to claim 1, wherein:
   said means for receiving and recognizing the identifying signal and said means for transmitting the second message to the Base Stations comprise a communication board;
   said means for conveying said first messages to an operator of the receiving/transmitting unit and means for the operator to generate said second messages comprise a computer board including electronic components; and
   said communication board is connected to said computer board by way of standard communication interface means, wherein said electronic components in said computer board control the operation of said communication board.

10. A portable unit according to claim 9, wherein the communication interface means is a PCMCIA interface.

11. A portable unit according to claim 9, wherein the communication board comprises a transmitter, a receiver, an antenna, data processing means and interface means to communicate with the processing means of the portable computer and to process data sent therefrom or received through the said antenna.

12. A personal location and message unit, for use with a Vehicle Location System, comprising:
   a housing;
   autonomous power supply means for supplying power to electronic components in the housing;
   receiving means for receiving first messages and signals broadcasted by a plurality of pagers;
   means for an operator of the unit to generate second messages for transmission to a plurality of Base Stations;
   transmission means for broadcasting said second messages and answer-back signals to said Base Stations;
   means for conveying received second messages to the operator of the unit; and
   computer means for recognizing a unit identifying code, and for elaborating received and transmitted signals; said computer means also for controlling:
   (i) said means for an operator to generate;
   (ii) said receiving means;
   (iii) said transmission means; and
   (iv) said means for conveying.

13. A vehicle and person location and communication system, comprising a combination of:
   (a) a master station associated with a plurality of base stations and a plurality of pagers, said master station being capable of broadcasting through the pagers a first message and an identifying signal, and said base stations being capable of receiving an answer-back signal and a second message and transmitting the answer-back signal and second message to said master station; and
   (b) a portable receiving/transmitting unit including,
      (i) means for recognizing the identifying signal associated with the portable receiving/transmitting unit and for receiving the identifying signal and first message;
      (ii) means for conveying said first message to an operator of the receiving/transmitting unit identified by said identifying signal; and
      (iii) means for the operator to generate the second message; and
      (iv) means for transmitting the second message from said receiving/transmitting unit to said base stations together with the answer-back signal;
   wherein said means for recognizing, said means for conveying, said means for the operator to generate, and said means for transmitting are integrated into said portable receiving/transmitting unit.

* * * * *